US012263769B2

(12) United States Patent
Bonk et al.

(10) Patent No.: US 12,263,769 B2
(45) Date of Patent: Apr. 1, 2025

(54) METHOD OF MANUFACTURING A HEAT MAT

(71) Applicant: Faurecia Automotive Seating, LLC, Auburn Hills, MI (US)

(72) Inventors: Jeffery T. Bonk, Chesterfield, MI (US); Maria-Teresa Camodeca, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 18/213,589

(22) Filed: Jun. 23, 2023

(65) Prior Publication Data
US 2024/0424965 A1    Dec. 26, 2024

(51) Int. Cl.
*B60N 2/70*    (2006.01)
*B60N 2/56*    (2006.01)

(52) U.S. Cl.
CPC ......... *B60N 2/7017* (2013.01); *B60N 2/5685* (2013.01)

(58) Field of Classification Search
CPC ....... B60N 2/7017; B60N 2/56; B60N 2/5685
See application file for complete search history.

(56) References Cited

U.S. PATENT DOCUMENTS

| | | | |
|---|---|---|---|
| 6,150,642 A * | 11/2000 | Weiss | H05B 3/34 219/217 |
| 8,608,892 B2 | 12/2013 | Winter | |
| 10,253,452 B2 | 4/2019 | Hwang | |
| 11,719,557 B2 | 8/2023 | Wilson | |
| 2001/0052590 A1 | 12/2001 | Ishida | |
| 2004/0173594 A1 * | 9/2004 | Weiss | H05B 3/342 219/217 |
| 2009/0262175 A1 | 10/2009 | Kim | |
| 2015/0048658 A1 | 2/2015 | Gawade | |
| 2015/0239379 A1 | 8/2015 | Yoshida | |
| 2015/0251597 A1 | 9/2015 | Salter | |
| 2019/0208580 A1 | 7/2019 | Conner | |
| 2020/0189428 A1 | 6/2020 | Kim | |
| 2023/0130566 A1 | 4/2023 | Durfee | |

FOREIGN PATENT DOCUMENTS

| | | |
|---|---|---|
| DE | 29911783 U1 | 11/2000 |
| DE | 102007001132 A1 | 7/2008 |
| DE | 102012000445 A1 | 9/2012 |
| DE | 102016110546 A1 | 12/2016 |

(Continued)

OTHER PUBLICATIONS

Flexible Coated Conductive Textiles as Ohmic Heaters in Car Seats, by Petru et al., Applied Sciences, vol. 13, 6874, published Jun. 6, 2023 (Year: 2023).*

(Continued)

*Primary Examiner* — Moshe Wilensky
(74) *Attorney, Agent, or Firm* — Barnes & Thornburg LLP

(57) ABSTRACT

A heat mat is configured to provide conductive heat to an occupant in a vehicle. The heat mat includes a mat foundation, a conductive layer coupled to the mat foundation, and a conductor harness configured to couple the conductive layer to a power source. The heat mat is configured to be installed on a vehicle component. A method includes assembling the mat foundation, the conductive layer, and the conductive harness together.

19 Claims, 10 Drawing Sheets

(56) References Cited

FOREIGN PATENT DOCUMENTS

| GB | 1287286 | A | 8/1972 |
|---|---|---|---|
| JP | 05139303 | A | 11/1991 |
| JP | 2006213237 | A | 8/2006 |
| JP | 4706111 | B2 | 6/2011 |
| WO | 202043679 | A1 | 3/2020 |

OTHER PUBLICATIONS https://leatherseats.com/seat-heater-guide/ (Year: 2022).*
Office Action (Non-Final Rejection) dated Mar. 25, 2024 for U.S. Appl. No. 17/245,745 (pp. 1-20).
Office Action (Non-Final Rejection) dated Sep. 24, 2024 for U.S. Appl. No. 17/245,745, IDFAUH20018 US-U | (pp. 1-26).

* cited by examiner

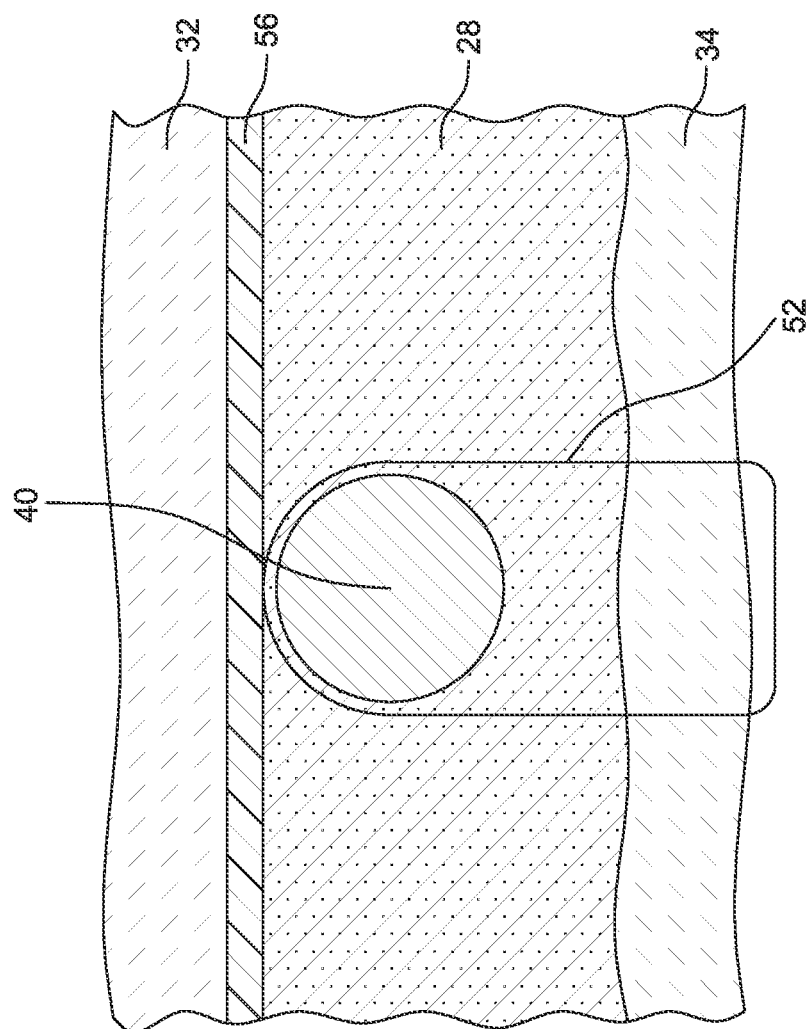
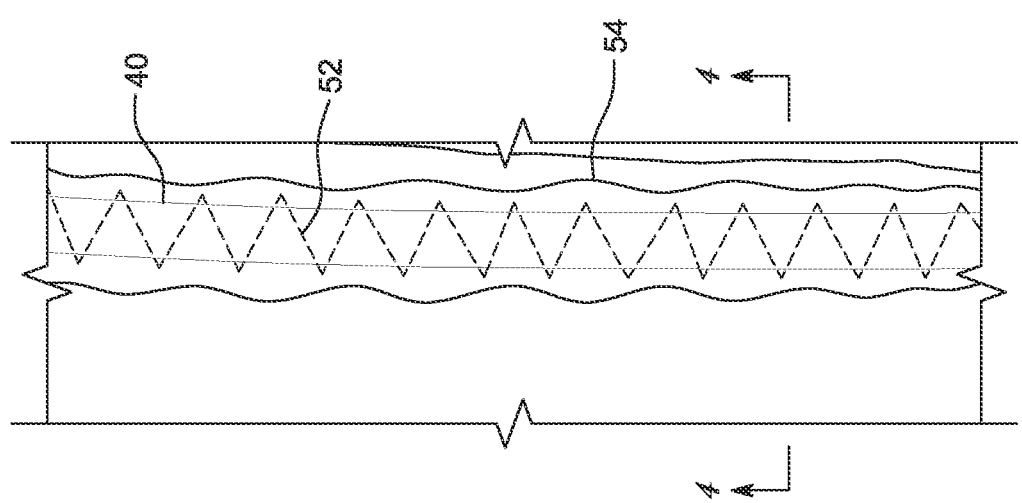

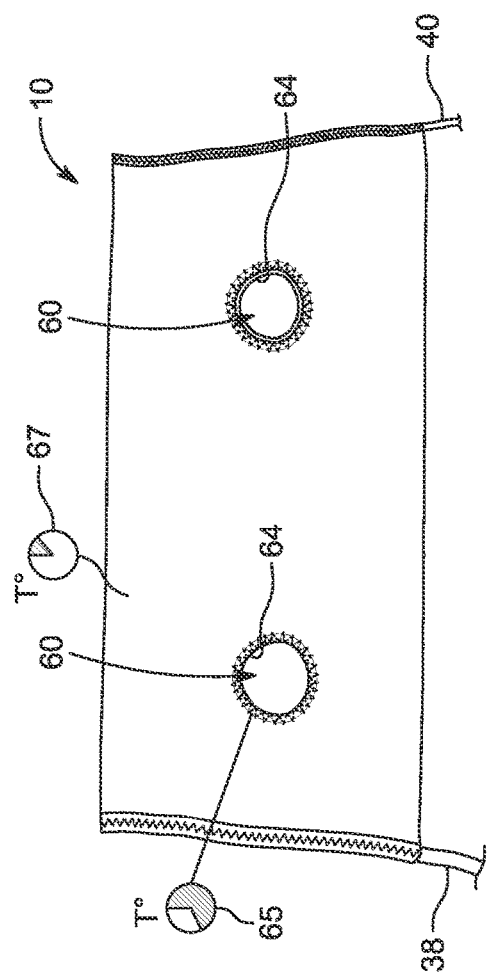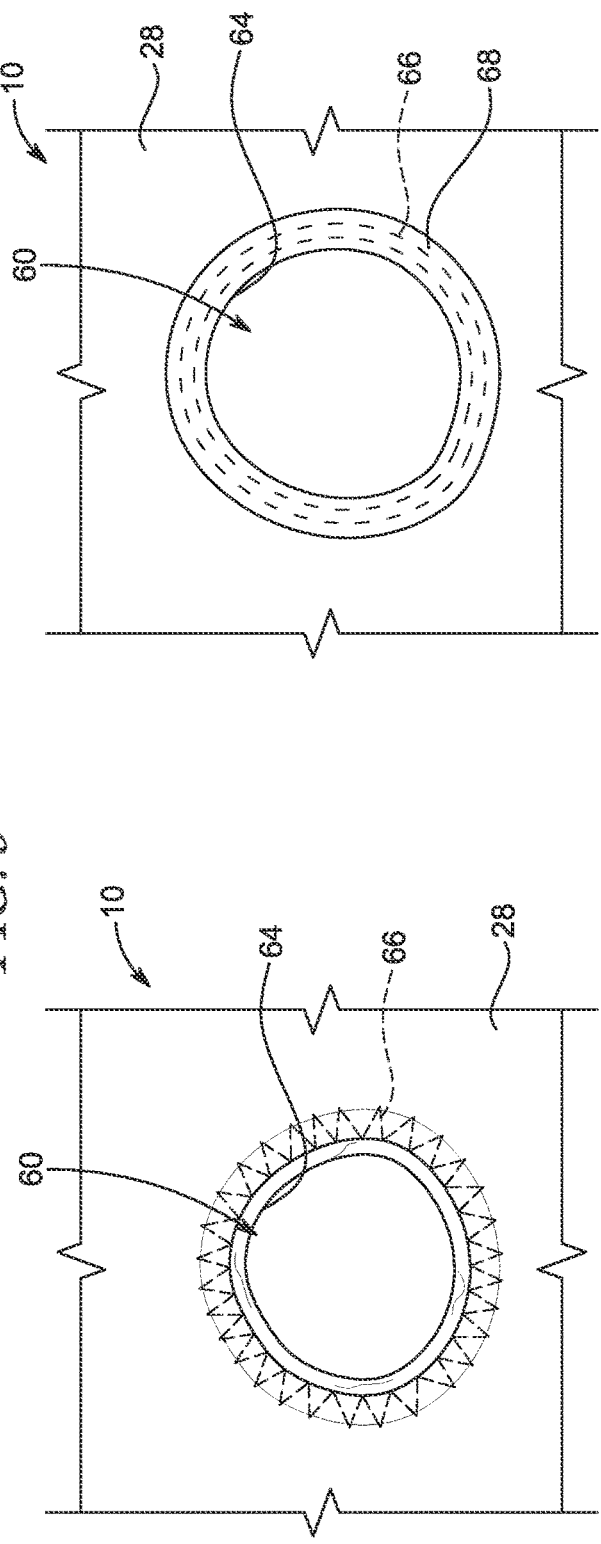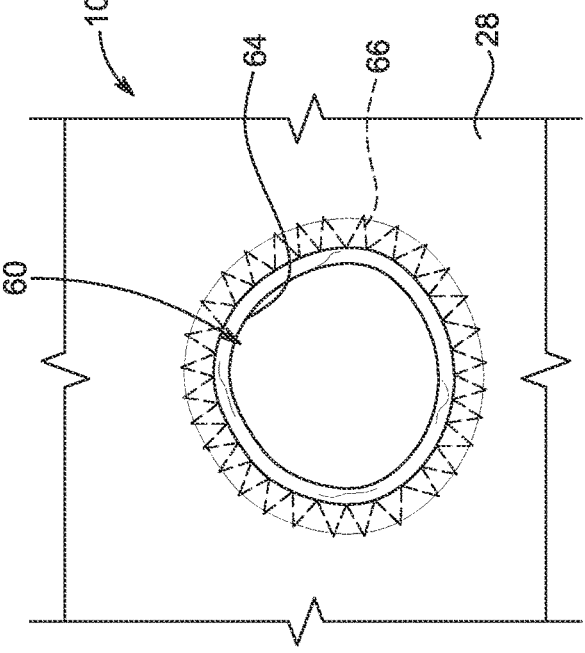

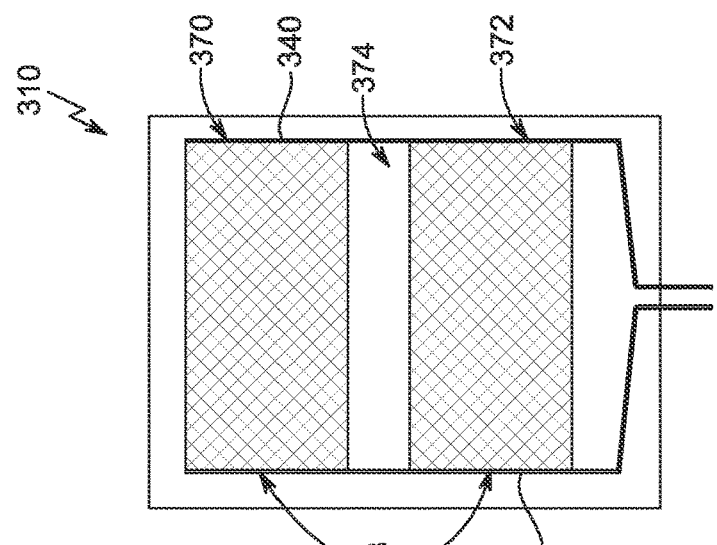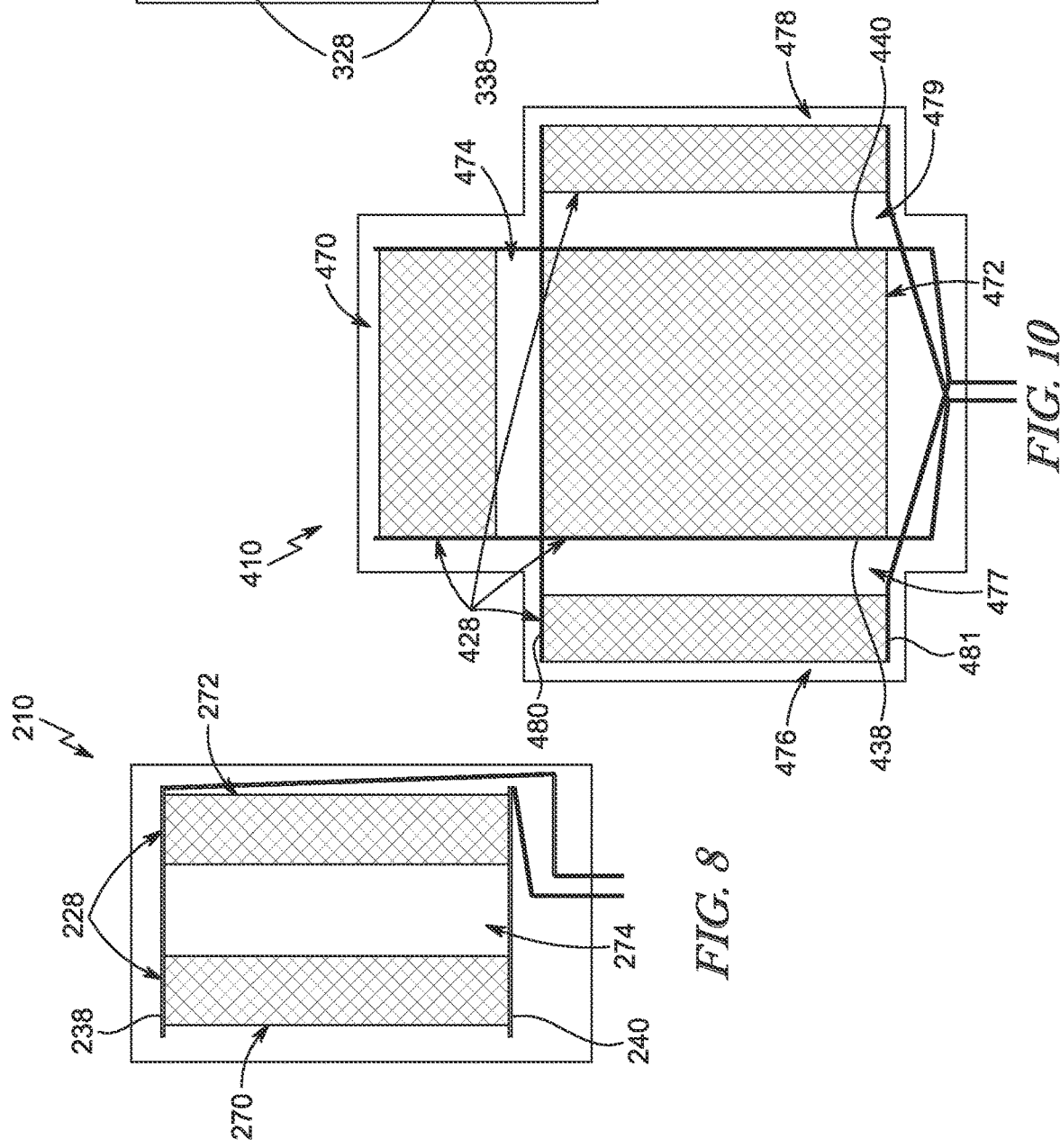

METHOD OF MANUFACTURING A HEAT MAT

BACKGROUND

The present disclosure relates to a heating device, and particularly to a method of manufacturing a heating device. More particularly, the present disclosure relates to a method of manufacturing a heating device for vehicle components.

SUMMARY

According to the present disclosure, a method of manufacturing a heat mat for a vehicle seat includes conveying a carrier sheet along a conveyor to a coating station. The method may further include applying a conductive-particle based fluid on the carrier sheet. The method may further include forming the coated carrier sheet into a conductive pad for the heat mat. The method may further include attaching a conductor harness to the conductive pad, the conductor harness including a positive conductor bar arranged on a first side of the conductive pad and a negative conductor bar on an opposite second side of the conductive pad. The method may further include applying a protective sheet over at least a portion of the conductor harness to locate the conductive-particle based fluid and the first and second conductive bars between the carrier sheet and the protective sheet and to provide the heat mat for the vehicle seat.

According to another aspect of the present disclosure, a heat mat is configured to provide conductive heat to an occupant in a vehicle. The heat mat includes a mat foundation having a top cover and a bottom cover. The heat mat may further include a conductive layer coupled to the mat foundation and arranged to lie between the top cover and the bottom cover. The heat mat may further include a conductor harness configured to couple the conductive layer to a power source.

In some embodiments, the conductor harness includes a positive conductor bar and a negative conductor bar. The positive conductor bar may be arranged to lie on a first lateral side of the mat foundation and the conductive layer. The negative conductor bar arranged to lie on an opposite, second lateral side of the mat foundation and the conductive layer. The conductor harness may further include a bar connector unit including a first sheathed wire connected to the positive conductor bar, a second sheathed wire connected to the negative conductor bar, and a connector plug coupled to the first and second sheathed wires and adapted to be attached to the power source.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 3 is an enlarged portion of the heat mat of FIG. 2;

FIG. 4 is a cross section taken along line 4-4 in FIG. 3;

FIG. 5 is a plan view of the heat mat with a plurality of ventilation openings formed therein;

FIG. 6 is a plan view of a portion of the heat mat from FIG. 5 showing that an inner edge defining one of the ventilation openings is reinforced with a metallic-based thread;

FIG. 7 is a plan view of a portion of the heat mat from FIG. 5 showing that an inner edge defining one of the ventilation openings is reinforced with a metallic-based foil or film;

FIG. 8 is a plan view of another embodiment of a heat mat having a conductive layer with a plurality of vertically-extending sections;

FIG. 9 is a plan view of another embodiment of a heat mat having a conductive layer with a plurality of horizontally-extending sections;

FIG. 10 is a plan view of another embodiment of a heat mat having a conductive layer with a top section, a bottom section, and left and right side bolster sections;

DETAILED DESCRIPTION

Figure 1:
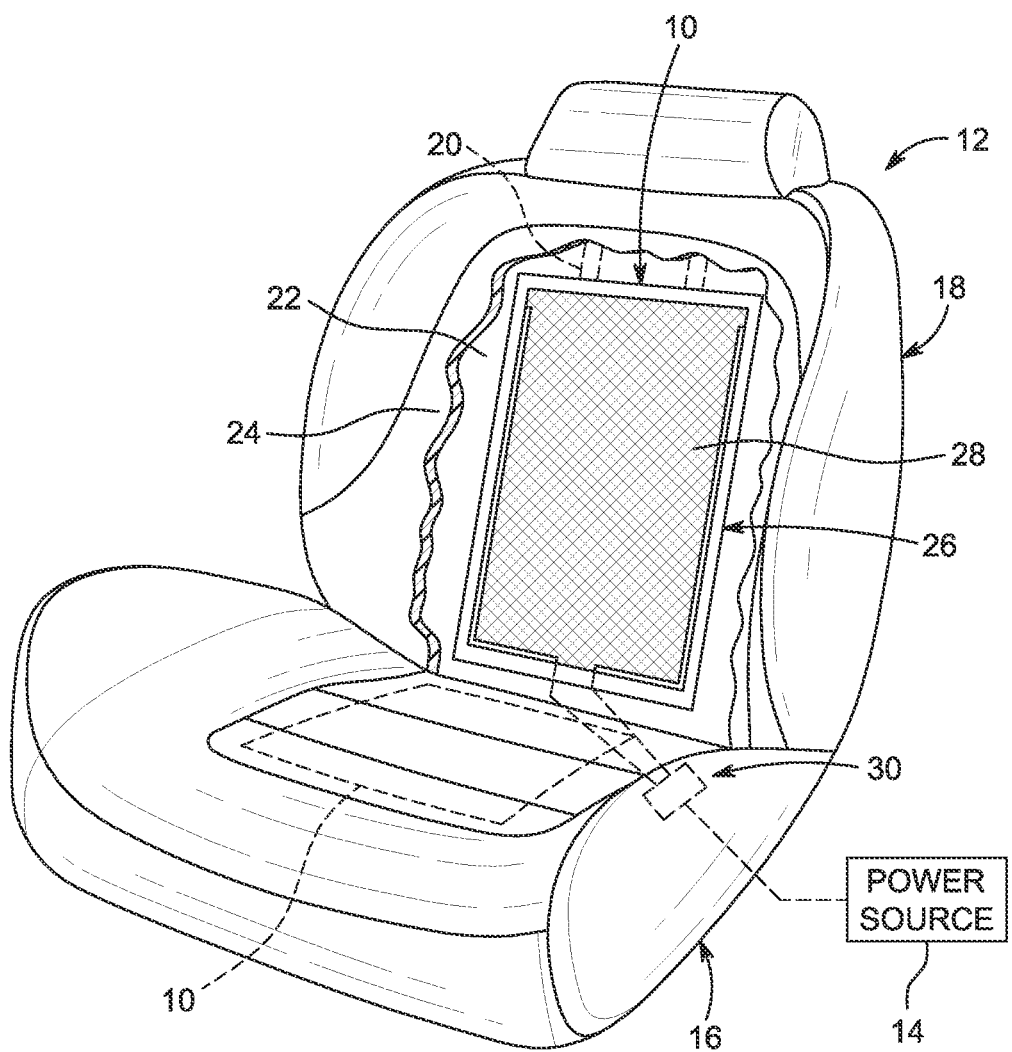
FIG. 1 is a perspective view of a vehicle seat with portions cut away to show a heat mat, in accordance with the present disclosure, attached to the vehicle seat and configured to provide thermal effects to an occupant.

A thermal mat 10, in accordance with the present disclosure, is configured to be installed on a vehicle component, such as vehicle seat 12 as shown in FIG. 1. The thermal mat 10 is illustratively a heat mat 10 that is configured to receive electrical energy from a power source 14 (i.e. a car battery). The heat mat 10 includes electrically-conductive material that provides conductive heat to the occupant when energized by power source 14. In other embodiments, the thermal mat 10 can use electrical energy to remove heat away from the occupant and thereby provide a cooling effect to the occupant, using a Peltier device, for example. In some embodiments, the heat mat 10 can be installed on other vehicle components such as an armrest, a console area, a steering wheel, or any other component that an occupant interacts with while in a vehicle.

The vehicle seat 12 includes a seat bottom 16 and a seat back 18 coupled to the seat bottom 16 and arranged to extend upwardly away from the seat bottom 16 as shown in FIG. 1. Both the seat bottom 16 and the seat back 18 include an internal, structural frame 20, foam cushion(s) 22, and an outer trim 24. The structural frame 20 is mounted to the vehicle to support the vehicle seat 12 in the vehicle. The foam cushion(s) 22 surround the structural frame 20 to provide a comfortable seating experience for the occupant. The outer trim 24 surrounds the foam cushion(s) 22 and forms an outermost surface of the vehicle seat 12.

Portions of the outer trim 24 are cut away in FIG. 1 to show the heat mat 10 installed on the vehicle seat 12. The heat mat 10 is illustratively installed on the vehicle seat 10 to reside between one or more of the foam cushions 22 and the outer trim 24 directly beneath areas where the occupant tends to contact the outer trim 24. The heat mat 10 may be installed on one or both of the seat bottom 16 and the seat back 18 and is configured to provide conductive heat to the occupant seated on the vehicle seat through the outer trim 24.

Figure 2:
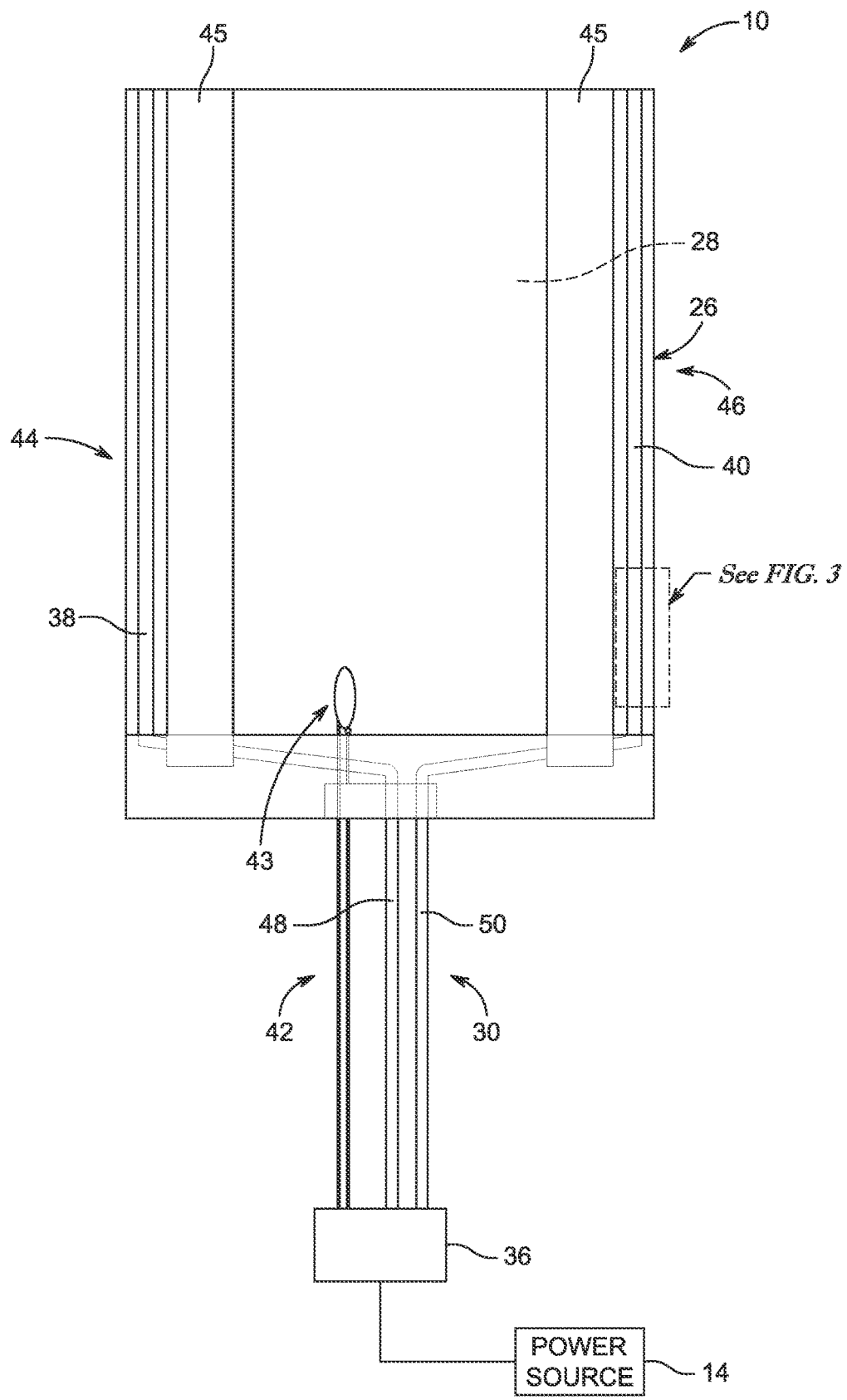
FIG. 2 is a plan view of the heat mat from FIG. 1 showing that the heat mat includes a mat foundation, a conductive layer coupled to the mat foundation, and a conductor harness coupled to the conductive layer and configured to form a circuit with the conductive layer and a power source.

The heat mat 10 includes a mat foundation 26, a conductive layer 28 coupled to the mat foundation 26, and a conductor harness 30 interconnecting the conductive layer 28 and the power source 14 as shown in FIGS. 1 and 2. The mat foundation 26 includes a top cover 32 that insulates the conductive layer 28 from the occupant and a bottom cover 34 that supports and carries the conductive layer 28. The conductive layer 28 is coupled to the mat foundation 26 and is arranged to lie between the top cover 32 and the bottom cover 34. The conductor harness 30 is configured to be attached to the conductive layer 28 between the top cover 32 and the bottom cover 34 and extends out from between the top and bottom covers 32, 34 to be attached to the power source 14 by a connector plug 36. The mat foundation 26 may further include one or more attachment strips 45 applied to the bottom cover 34 and configured to attach the heat mat 10 to the vehicle seat 12.

The top and bottom covers 32, 34 are each made from a non-woven, fabric material to bond with the conductive layer 28 during manufacture of the heat mat 10 as explained in heat-mat forming process 100 below. The bottom cover 32 provides a base substrate that the conductive layer 28 is attached to first during the process 100. The top cover 34 is then applied over the conductive layer 28 and portions of the conductor harness 30 to encapsulate the conducive layer and the portions of the conductor harness 30 between the bottom cover 32 and the top cover 34. The fabric used for the top and bottom covers 32, 34 is made from Polyethylene terephthalate (PET), although other materials are also possible. It should be appreciated that the terms top and bottom can be used interchangeably depending on the orientation of the heat mat 10.

The conductive layer 28 is electrically conductive and cooperates with the conductor harness 30 to form a circuit so that electricity from the power source 14 is free to flow therethrough. In the illustrative embodiment shown in FIG. 2, the conductive layer 28 is a single, one-piece layer that is uninterrupted and/or unbroken between each edge thereof. The conductive layer 28 is formed from a conductive-particle based fluid that is applied on the bottom cover 32 in at least a partially fluid state during the process 100. Once the conductive-particle based fluid dries or cures, the conductive layer 28 is formed. One exemplary conductive-particle based fluid that can be used to form the conductive layer 28 can include TUBALL™ graphene nanotubes provided by OCSiAl LLC, located at 950 Taylor Station Road, Suite W, Gahanna, OH 43230, USA.

The conductor harness 30 includes a positive conductor bar 38, a negative conductor bar 40, and a bar connector unit 42 as shown in FIG. 2. The positive conductor bar 28 is arranged to lie on a first lateral side 44 of the mat foundation 26 and the conductive layer 28. The negative conductor bar 40 is arranged to lie on an opposite, second lateral side 46 of the mat foundation 26 and the conductive layer 28. The positive and negative conductor bars 38, 40 are spaced as far apart from one another as possible while maintaining contact with opposite sides of the conductive layer 28 to maximize the conductive area of the heat mat 10. The bar connector unit 42 may be formed separately or integrally with the conductor bars 38, 40 and interconnects the conductor bars 38, 40 to the power source 14.

The bar connector unit 42 may further include a sensor 43 coupled to the conductive layer 28 and configured to monitor an electrical property passing through the conductive layer 28 during use. The sensor 43 may be an ohmic sensor configured to measure resistivity through the conductive layer 28. Other types of suitable sensors such as capacitive sensors or thermometers can also be used.

Each of the conductor bars 38, 40 are unsheathed wires or another metallic structure to form a direct, conductive connection with the conductive layer 28. The conductor bar unit 42 includes a first sheathed wire 48 connected to the positive conductor bar 38, a second sheathed wire 50 connected to the negative conductor bar 40, and the connector plug 36 coupled to the first and second sheathed wires 48, 50 and adapted to be attached to the power source 14. Each of the sheathed wires 48, 50 protrude from the mat foundation 26 and extend to the connector plug 36.

The conductor bars 38, 40 are attached to the mat foundation 26 and the conductive layer 28 by stitching with a thread 52 as shown in FIG. 3. The thread 52 is stitched in a zig-zag formation along a length of the conductor bars 38, 40, however, any suitable stitching formation may be used. The thread 52 is configured to pass through the conductive layer 28 and at least one of the top and bottom covers 32, 34 to tie the conductor bars 38, 40 in place relative to the conductive layer 28. In some embodiments, the thread 52 is conductive to increase conductivity in the connection between conductor bars 38, 40 and the conductive layer 28. In some embodiments, an additional layer of the conductive-particle based fluid 54 can be applied over the conductor bars 38, 40 to encapsulate the conductor bars 38, 40 in the conductive layer 28 with or without the thread 52. In the illustrative embodiment, the thread 52 includes copper, however, other metallic elements or materials may also be used.

The mat foundation 26 may further include one or more adhesive layers 56 applied between the top and/or bottom cover 32, 34 and the conductive layer 28 as shown in FIG. 4. In the illustrative embodiment, an adhesive layer 56 is applied to a back side of the top layer 32 before the top layer 32 is applied on the conductive layer 28. The adhesive layer 56 is optional as the top cover 32 may bond with the conductive layer 28 if the top layer 32 is applied before the conducive layer 28 has fully dried or cured.

In some embodiments, the heat mat 10 can be formed to include one or more ventilation openings 60 that pass all the way through the heat mat 10 as shown in FIGS. 5-7. The vehicle seat 12 may further includes a ventilation duct 62 having a passageway that is aligned with the ventilation opening(s) 60 formed in the heat mat 10 when the heat mat is installed on the vehicle seat 12 as suggested in FIG. 15C. In this way, air is able to flow through the ventilation openings 60 to the occupant for increased comfort in hotter climates.

Each of the ventilation openings 60 are defined by an inner edge 64 as shown in FIGS. 5-7. In some embodiments, the removal of material in the heat mat 10 to form the ventilation openings 60 may cause increased electrical current flow along the inner edges 64 defining the openings 60. This can cause higher temperature areas 65 along the inner edges 64 and lower temperature areas 67 spaced away from the inner edges 64 as shown in FIG. 5. The inner edge 64 of each ventilation opening 60 may be reinforced so that areas of the heat mat 10 immediately surrounding the ventilation openings 60 are able to withstand the higher current flow there through and provide a more even temperature distribution along the heat mat 10. In some embodiments, the inner edges 64 are reinforced by a metallic-based thread 66 that is stitched through the mat foundation 26 and the conductive layer 28 around each of the ventilation openings 60 as shown in FIG. 6. In some embodiments, the inner edges 64 are reinforced by a metallic-based foil 68 that lines the inner edges 64 as shown in FIG. 7. In some embodiments, an additional layer or film 56 of the conductive-particle based fluid is applied to the inner edges 64. In some embodiments, two or more of the metallic-based thread 66, the metallic-based foil 68, the additional layer 56, and/or another metallic reinforcement structure, are used together. The metallic structures are configured to increase conductivity through the conductive layer 28 along the inner edges 64.

In some embodiments, the conductive layer 28 includes a plurality of sections separate from one another as shown in FIGS. 8-10. Separating the conductive layer 28 into multiple sections can arrange the conductive layer 28 in areas where the occupant would be expected to contact the occupant support.

One embodiment of a heat mat 210 that includes a plurality of sections of a conductive layer 228 is shown in FIG. 8. The plurality of sections include left and right vertically-extending sections 270, 272. The vertically-extending sections 270, 272 are separated from one another by a vertically-extending gap 274 therebetween. Positive and negative conductor bars 238, 240 are arranged at upper and lower ends, respectively, of the vertically-extending sections 270, 272. Each of the vertically-extending sections 270, 272 interconnect the positive and negative conductor bars 238, 240.

Another embodiment of a heat mat 310 that includes a plurality of sections of a conductive layer 328 is shown in FIG. 9. The plurality of sections include upper and lower horizontally-extending sections 370, 372. The horizontally-extending sections 370, 372 are separated from one another by a horizontally-extending gap 374 therebetween. Positive and negative conductor bars 338, 340 are arranged at left and right ends, respectively, of the horizontally-extending sections 370, 372. Each of the horizontally-extending sections 370, 372 interconnect the positive and negative conductor bars 338, 340.

Another embodiment of a heat mat 410 that includes a plurality of sections of a conductive layer 428 is shown in FIG. 10. The plurality of sections include upper and lower sections 470, 472 and left and right side bolster sections 476, 478. The upper and lower sections 470, 472 are separated from one another by a horizontally-extending gap 474 therebetween. The left and right side bolster sections 476, 478 are separated from one another by the lower section 472 and side gaps 477, 479 on each side of the lower section 472. Positive and negative conductor bars 438, 440 are arranged at left and right ends, respectively, of the horizontally-extending sections 470, 472. Each of the horizontally-extending sections 470, 472 interconnect the positive and negative conductor bars 438, 440. Additional upper and lower conductor bars 480, 481 are coupled to upper and lower ends of the left and right side bolster sections 476, 478. The additional conductor bars 480, 481 may form a separate circuit with the left and right side bolster sections 476, 478 or may be on the same circuit with the upper and lower sections 470, 472.

Figure 11:
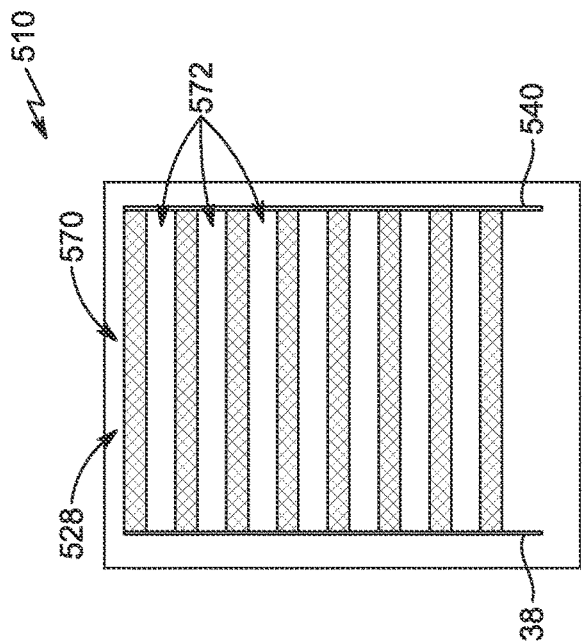
FIG. 11 is a plan view of another embodiment of a heat mat having a conductive layer with a plurality of strips.
Figure 12:
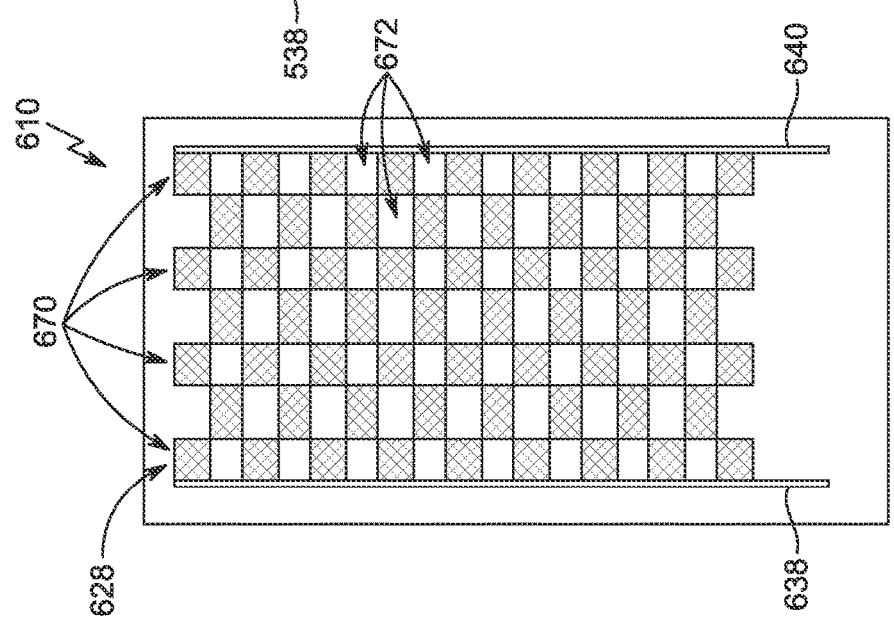
FIG. 12 is a plan view of another embodiment of a heat mat having a conductive layer with tiles arranged in a checkered pattern.
Figure 13:
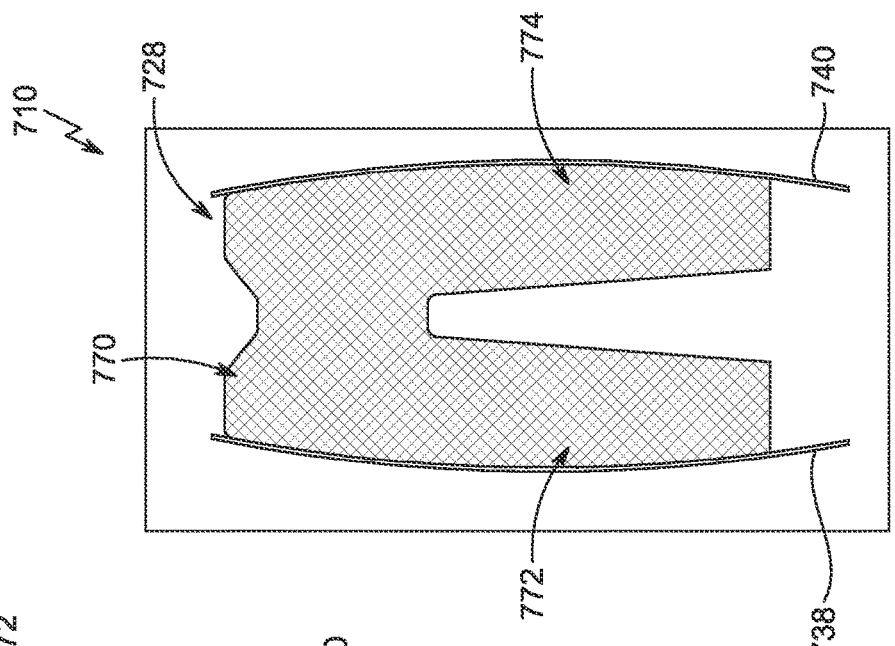
FIG. 13 is a plan view of another embodiment of a heat mat having a conductive layer with a torso section and a pair of leg sections.

The conductive layer 28 can also be sized and shaped with a predetermined pattern as shown in FIGS. 11-13. Forming the conductive layer 28 into a predetermined pattern can arrange the conductive layer 28 in areas where the occupant would be expected to contact the vehicle seat 12 and/or use less material in forming the conductive layer 28 thereby saving cost.

Another embodiment of a heat mat 510 having a conductive layer 528 in a predetermined pattern is shown in FIG. 11. The conductive layer 528 is arranged in a plurality of strips 570 that are all separated from one another by gaps 572. Positive and negative conductor bars 538, 540 are arranged at opposite ends of each of the plurality of strips 570. Each of the plurality of strips 570 interconnects the positive and negative conductor bars 538, 540.

Another embodiment of a heat mat 610 having a conductive layer 628 in a predetermined pattern is shown in FIG. 12. The conductive layer 628 includes a plurality of conductive tiles 670 arranged in a checkered pattern such that a gap 672 is formed above, below, and on each side of the tiles. Positive and negative conductor bars 638, 640 are arranged at opposite ends of each of the conductive layer 628. Tiles 670 forming lateral edges of the conductive layer 628 are connected to the positive and negative conductor bars 538, 540. Each tile 670 is also connected to at least one other tile 670 such that the positive and negative conductor bars 638, 640 are interconnected by the tiles 670 as a whole.

Another embodiment of a heat mat 710 having a conductive layer 728 in a predetermined pattern is shown in FIG. 13. The conductive layer 728 includes a torso section 770 corresponding with a torso of the occupant and first and second leg sections 772, 774 spaced apart from one another and corresponding with each leg of the occupant. Positive and negative conductor bars 738, 740 are arranged at opposite ends of each of the sections 770, 772, 774. Each of the sections 770, 772, 774 interconnects the positive and negative conductor bars 738, 740.

Figure 14:
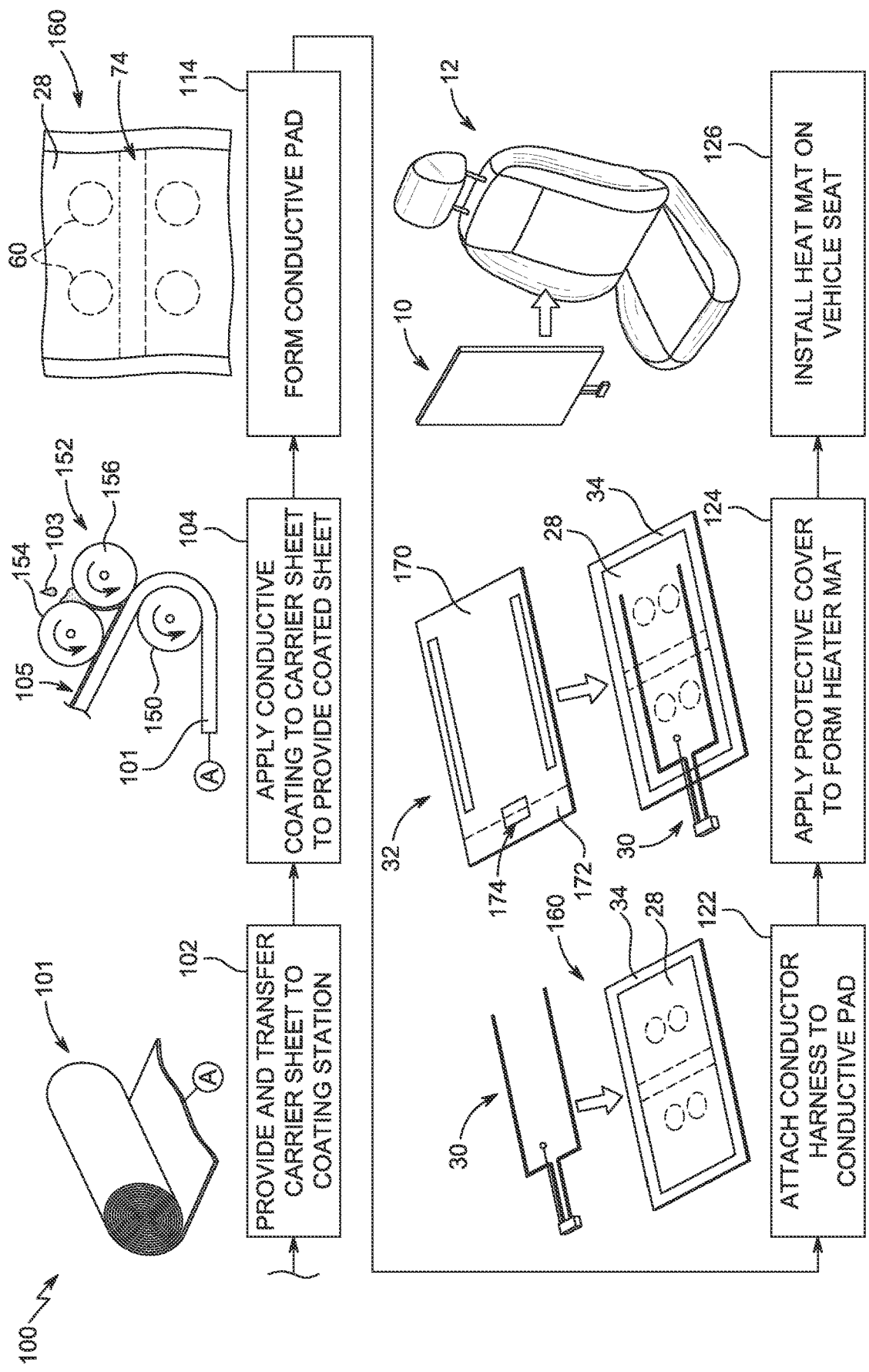
FIG. 14 is a flow chart illustrating an exemplary process by which the heat mats disclosed herein can be formed and installed on a vehicle seat.
Figure 15A:
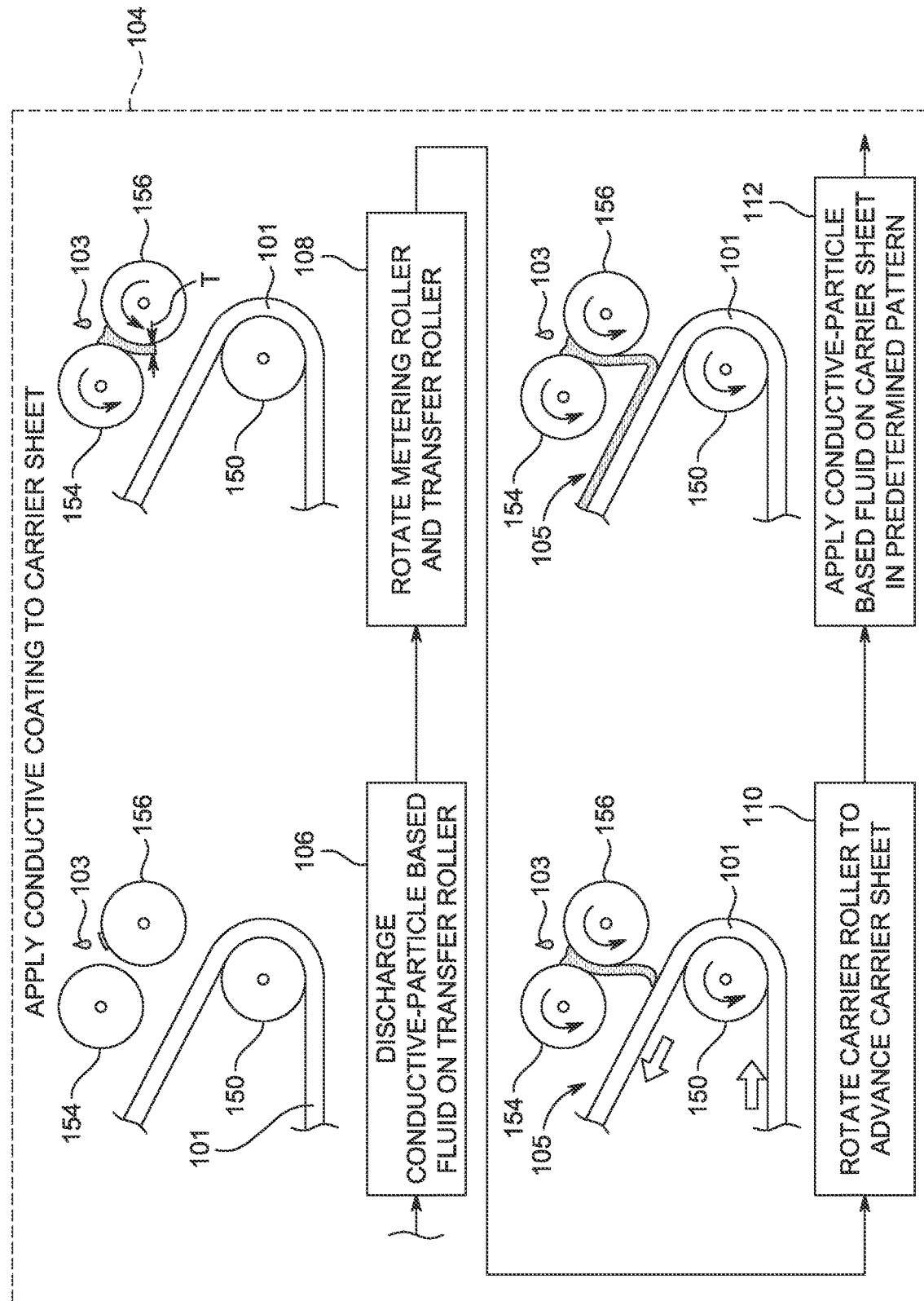
FIG. 15A is a flow chart illustrating a sub-process by which conductive-particle based fluid is applied to a carrier sheet to form one of the conductive layers disclosed herein.
Figure 15B:
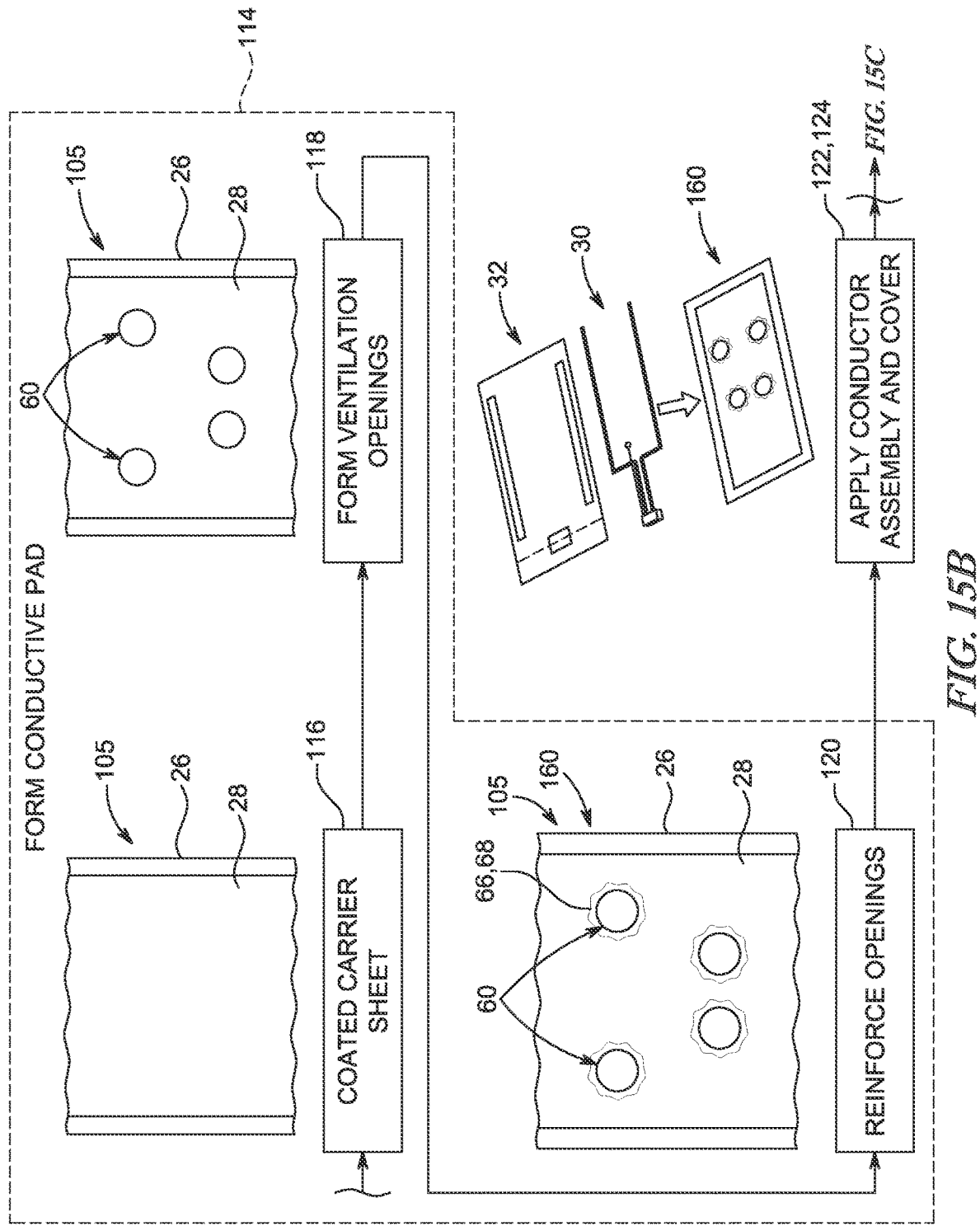
FIG. 15B is a flow chart illustrating a sub-process by which a conductive pad is formed to be used in one of the heat mats disclosed herein.
Figure 15C:
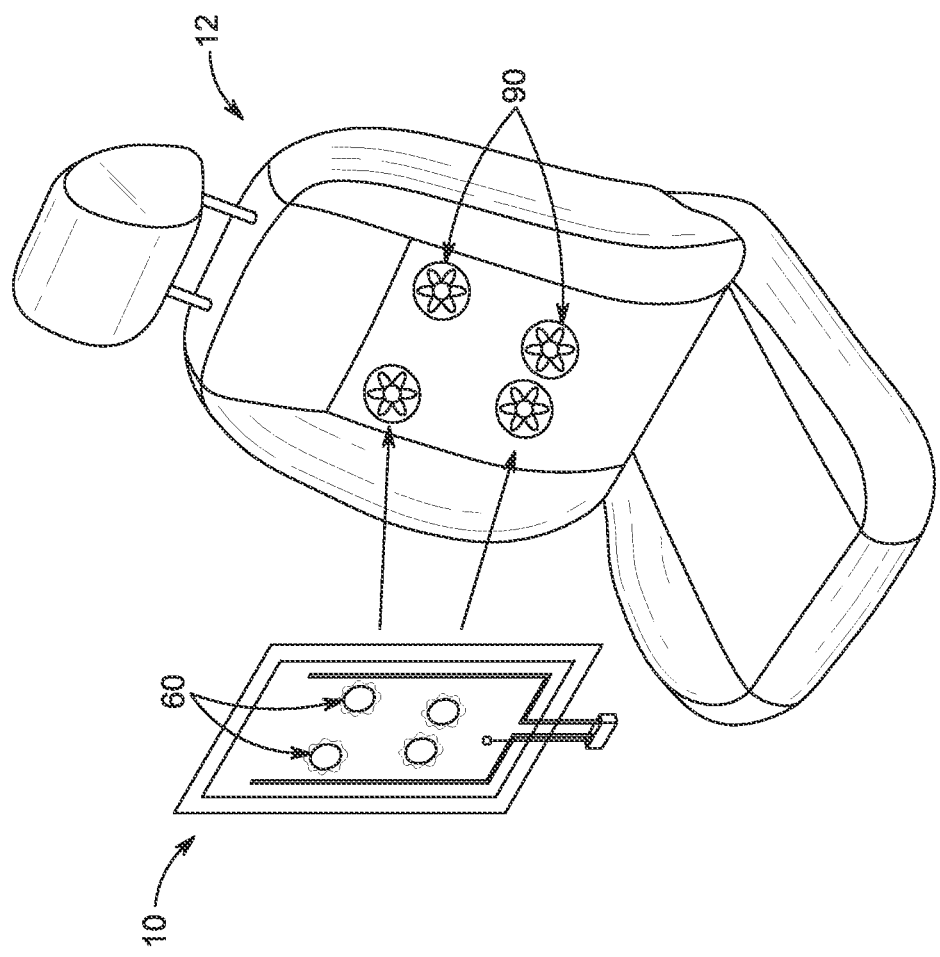
FIG. 15C shows a heat mat being installed on a vehicle seat where a plurality of ventilation openings are aligned with ventilation ducts formed in the vehicle seat.

Each of the heat mats 10, 210, 310, 410, 510, 610, 710 can be formed and installed on the vehicle seat 12 according to a process 100 shown in FIGS. 14-15C. The process begins with a step 102 of providing a carrier sheet 101 (i.e. bottom cover 34). The carrier sheet 101 becomes top or bottom cover 32, 34 when the heat mat is fully formed. The carrier sheet 101 is conveyed to a coating station 152 by a conveyor having one or more carrier rollers 150.

The process 100 further includes a step 104 of applying a conductive-particle based coating 103 to the carrier sheet 101 at the coating station 152 as shown in FIG. 14. The coating station 152 includes a metering roller 154 and a transfer roller 156 located on an opposite side of the carrier sheet 101 from the carrier roller 150. The conductive-particle based fluid 103 is applied on the carrier sheet 101 with the transfer roller 156 to provide a coated carrier sheet 105.

The step 104 of applying the conductive-particle based fluid 103 includes several sub-steps as shown in FIG. 15A. The step 104 may include a step 106 of discharging the conductive-particle based fluid 103 onto the transfer roller 156. The conductive-particle based fluid 103 can be discharged by gravity onto the transfer roller 156 or printed onto the transfer roller 156 using an ink jet printer, for example. The step 104 may further include a step 108 of rotating the metering roller 154 and the transfer roller 156 in the same direction to bring the conductive-particle based fluid into contact with the metering roller 154 and to provide a uniform thickness T of the conductive-particle based fluid 103. The step 104 may include a step 110 of rotating the carrier roller 150 in the same direction as the metering roller 154 and the transfer roller 156 to advance the carrier sheet 101 past the transfer roller 156 and the conductive-particle based fluid 103 having the uniform thickness T so that the conductive-particle based fluid 103 is transferred to the carrier sheet 101 to provide the coated carrier sheet 105. The step 104 may include a step 112 of applying the conductive-particle based fluid 103 on the carrier sheet 101 in a predetermined pattern or arrangement to form one of the heat mats 210, 310, 410, 510, 610, 710 with a specific conductive layer arrangement.

In some embodiments, the step 104 includes applying a plurality of sections of the conductive-particle based fluid 103 to the carrier sheet 101. In some embodiments, the step 104 includes applying a plurality of sections of the conductive-particle based fluid 103 to the carrier sheet 101 includes periodically stopping rotation of at least one of the metering roller 154 and the transfer roller 156 to stop application of the conductive-particle based fluid 103 on the carrier sheet 101 at predetermined intervals along the carrier sheet 101. In some embodiments, the step 104 includes transferring a predetermined pattern to the carrier sheet so that the coated carrier sheet has the predetermined pattern. The predetermined pattern is defined by at least two sections where the conductive-particle based fluid 103 is applied and separated by at least one section or gap where there is no conductive-particle based fluid 103. In some embodiments, the step 104 includes applying the conductive-particle based fluid 103 to the carrier sheet 101 in a predetermined shape having regions that correspond with anticipated high-pressure areas between the heat mat and the occupant.

Once the conductive-particle based fluid 103 is applied on the carrier sheet 101 to form the coated sheet 105, the process 100 may further include a step 114 of forming a conductive pad 160 for the heat mat. The step 114 of forming the conductive pad 160 can include multiple substeps as shown in FIG. 15B. The step 114 may include a step 116 of trimming the coated carrier sheet 105 to form individual, coated sheets. The step 114 may include a step 118 of forming ventilation openings 60 in the coated carrier sheet 105. The step 114 may include a step 120 of reinforcing the inner edges of the ventilation openings 60. Reinforcing the edge may include increasing conductivity at the edge of the openings 60.

The process 100 may further include a step 122 of attaching the conductor harness 30 to the conductive pad 160 as shown in FIG. 14. Attaching the conductor harness 30 to the conductive pad 160 may include sewing the positive and negative conductor bars 38, 40 to the carrier sheet 101 with a thread 52 over the conductive-particle based fluid 103. Attaching the conductor harness 30 to the conductive pad 160 may include applying an additional layer 54 of the conductive-particle based fluid 103 over the positive and negative conductor bars 38, 40 and the thread 52.

The process 100 may further include a step 124 of applying a protective sheet (i.e. top cover 32) over at least a portion of the conductor harness 30 to locate the conductive-particle based fluid 103 and the first and second conductive bars 38, 40 between the carrier sheet 101 and the protective sheet and to provide the heat mat 10 for the vehicle seat 12. Applying the protective cover may include applying an adhesive 56 around a perimeter of the conductive pad 160 and placing the protective cover on the adhesive 56.

In some embodiments, the top or bottom cover 32, 34 includes a cover body 170 and a cover extension 172. An aperture 174 is formed at least partially in the cover extension 172. Applying the protective cover to the conductive pad includes inserting the conductor harness 30 through the aperture 174 formed in the cover extension 172 and folding the cover extension 172 around the conductive pad 160 so that a portion of the cover extension 172 attaches to a backside of the carrier sheet 101.

The process 100 may further include a step 126 of installing the heat mat 10 on a vehicle seat. The step 126 of installing the heat mat 10 on the vehicle seat 12 may include aligning one or more ventilation openings 60 with corresponding ventilation ducts or passages 90 formed in the vehicle seat 12.

The following numbered clauses include embodiments that are contemplated and non-limiting:

Clause 1. A heat mat configured to provide conductive heat to an occupant in a vehicle.

Clause 2. The heat mat of clause 1, any other suitable clause, or any suitable combination of clauses, the heat mat including a mat foundation having a top cover and a bottom cover.

Clause 3. The heat mat of clause 2, any other suitable clause, or any suitable combination of clauses, the heat mat including a conductive layer.

Clause 4. The heat mat of clause 3, any other suitable clause, or any suitable combination of clauses, wherein the conductive layer is coupled to the mat foundation and arranged to lie between the top cover and the bottom cover.

Clause 5. The heat mat of clause 4, any other suitable clause, or any suitable combination of clauses, the heat mat including a conductor harness configured to couple the conductive layer to a power source.

Clause 6. The heat mat of clause 5, any other suitable clause, or any suitable combination of clauses, wherein the conductor harness includes a positive conductor bar arranged to lie on a first lateral side of the mat foundation and the conductive layer, a negative conductor bar arranged to lie on an opposite, second lateral side of the mat foundation and the conductive layer, and a bar connector unit including a first sheathed wire connected to the positive conductor bar, a second sheathed wire connected to the negative conductor bar, and a connector plug coupled to the first and second sheathed wires and adapted to be attached to the power source.

Clause 7. The heat mat of clause 6, any other suitable clause, or any suitable combination of clauses, wherein the bar connector unit further includes a sensor coupled to the conductive layer and configured to monitor an electrical property passing through the conductive layer during use.

Clause 8. The heat mat of clause 7, any other suitable clause, or any suitable combination of clauses, wherein the sensor is an ohmic sensor configured to measure resistivity through the conductive layer.

Clause 9. The heat mat of clause 6, any other suitable clause, or any suitable combination of clauses, wherein the bottom cover includes a fabric substrate.

Clause 10. The heat mat of clause 9, any other suitable clause, or any suitable combination of clauses, wherein the top cover includes the fabric substrate.

Clause 11. The heat mat of clause 10, any other suitable clause, or any suitable combination of clauses, wherein the conductive layer includes a conductive-particle based fluid.

Clause 12. The heat mat of clause 11, any other suitable clause, or any suitable combination of clauses, wherein the mat foundation further includes an adhesive layer applied between the conductive-particle based fluid and the top cover.

Clause 13. The heat mat of clause 10, any other suitable clause, or any suitable combination of clauses, wherein the top cover includes a cover base applied over the entire conductive layer and the positive and negative conductor bars and a cover extension coupled to the cover base and that wraps around the conductive layer and a portion of the bottom cover to attach to a backside of the bottom cover.

Clause 14. The heat mat of clause 13, any other suitable clause, or any suitable combination of clauses, wherein the top cover is formed to include an aperture that extends through the cover extension and wherein the first and second sheathed wires of the conductor harness extend through the aperture.

Clause 15. The heat mat of clause 6, any other suitable clause, or any suitable combination of clauses, wherein the positive and negative conductor bars are attached to the conductive layer by sewing with a thread.

Clause 16. The heat mat of clause 15, any other suitable clause, or any suitable combination of clauses, wherein the thread is arranged to pass through the conductive layer and the bottom cover.

Clause 17. The heat mat of clause 16, any other suitable clause, or any suitable combination of clauses, wherein the thread is non-conductive.

Clause 19. The heat mat of clause 17, any other suitable clause, or any suitable combination of clauses, wherein the mat foundation further includes an additional conductive layer applied over the thread to locate the thread between the conductive layer and the additional conductive layer.

Clause 20. The heat mat of clause 6, any other suitable clause, or any suitable combination of clauses, wherein the mat foundation further includes a plurality of attachment strips applied to the bottom cover and configured to attach the heat mat to a vehicle seat.

Clause 21. The heat mat of clause 6, any other suitable clause, or any suitable combination of clauses, wherein the mat foundation and the conductive layer are formed to include a ventilation opening that passes all the way through the heat mat.

Clause 22. The heat mat of clause 21, any other suitable clause, or any suitable combination of clauses, wherein the ventilation opening is defined by an inner edge and the inner edge is reinforced.

Clause 23. The heat mat of clause 22, any other suitable clause, or any suitable combination of clauses, wherein the inner edge is reinforced by a metallic-based thread that is stitched through the mat foundation and the conductive layer.

Clause 24. The heat mat of clause 22, any other suitable clause, or any suitable combination of clauses, wherein the inner edge is reinforced by a metallic-based foil that lines the inner edge.

Clause 25. The heat mat of clause 22, any other suitable clause, or any suitable combination of clauses, wherein the inner edge is reinforced by an additional layer of conductive-particle based fluid that lines the inner edge.

Clause 26. The heat mat of clause 22, any other suitable clause, or any suitable combination of clauses, wherein the inner edge is reinforced by metallic structure that is configured to increase conductivity through the conductive layer along the inner edge.

Clause 27. A vehicle seat including a seat bottom, a seat back coupled to the seat bottom and arranged to extend upwardly away from the seat bottom, and a heat mat configured to provide conductive heat to an occupant seated on the vehicle seat.

Clause 28. The vehicle seat of clause 27, any other suitable clause, or any suitable combination of clauses, the heat mat including a mat foundation having a top cover and a bottom cover.

Clause 29. The vehicle seat of clause 28, any other suitable clause, or any suitable combination of clauses, a conductive layer coupled to the mat foundation and arranged to lie between the top cover and the bottom cover.

Clause 30. The vehicle seat of clause 29, any other suitable clause, or any suitable combination of clauses, wherein the mat foundation and the conductive layer are formed to include a ventilation opening that passes all the way through the heat mat and the vehicle seat further includes a ventilation duct having a passageway that is aligned with the ventilation opening formed in the heat mat.

Clause 31. The vehicle seat of clause 30, any other suitable clause, or any suitable combination of clauses, wherein the ventilation opening is defined by an inner edge and the inner edge is reinforced.

Clause 32. The vehicle seat of clause 31, any other suitable clause, or any suitable combination of clauses, wherein the inner edge is reinforced by a metallic-based thread that is stitched through the mat foundation and the conductive layer.

Clause 33. The vehicle seat of clause 30, any other suitable clause, or any suitable combination of clauses, wherein the inner edge is reinforced by a metallic-based foil that lines the inner edge.

Clause 34. The vehicle seat of clause 33, any other suitable clause, or any suitable combination of clauses, wherein the inner edge is reinforced by metallic structure that is configured to increase conductivity through the conductive layer along the inner edge.

Clause 35. The vehicle seat of clause 29, any other suitable clause, or any suitable combination of clauses, wherein the heat mat further includes a conductor harness configured to couple the conductive layer to a power source, and wherein the conductor harness includes a positive conductor bar arranged to lie on a first lateral side of the mat foundation and the conductive layer, a negative conductor bar arranged to lie on an opposite, second lateral side of the mat foundation and the conductive layer, and a bar connector unit including a first sheathed wire connected to the positive conductor bar, a second sheathed wire connected to the negative conductor bar, and a connector plug coupled to the first and second sheathed wires and adapted to be attached to the power source.

Clause 36. The vehicle seat of clause 35, any other suitable clause, or any suitable combination of clauses, wherein the conductive layer includes a plurality of sections separate from one another and interconnecting the positive and negative conductor bars.

Clause 37. The vehicle seat of clause 36, any other suitable clause, or any suitable combination of clauses, wherein the plurality of sections includes a lower section and an upper section spaced apart from the lower section.

Clause 38. The vehicle seat of clause 36, any other suitable clause, or any suitable combination of clauses, wherein the plurality of sections includes a left lateral section and a right lateral section.

Clause 39. The vehicle seat of clause 38, any other suitable clause, or any suitable combination of clauses, wherein the plurality of sections further includes front and upper sections and the conductor harness further includes additional conductor bars coupled to the front and upper sections and to a respective one of the positive and negative conductor bars.

Clause 40. The vehicle seat of clause 35, any other suitable clause, or any suitable combination of clauses, wherein the conductive layer includes a plurality of sections arranged in a checkered pattern.

Clause 41. The vehicle seat of clause 35, any other suitable clause, or any suitable combination of clauses, wherein the conductive layer is arranged in a predetermined shape having regions that correspond with anticipated high-pressure areas between the heat mat and the occupant.

Clause 42. The vehicle seat of clause 41, any other suitable clause, or any suitable combination of clauses, wherein the predetermined shape includes a torso section corresponding with a torso of the occupant and first and second leg sections spaced apart from one another and corresponding with each leg of the occupant.

Clause 43. A method of manufacturing a heat mat for a vehicle seat.

Clause 44. The method of clause 43, any other suitable clause, or any suitable combination of clauses, the method including conveying a carrier sheet along a conveyor to a coating station, the conveyor including at least one carrier roller, the coating station including a metering roller and a transfer roller located on an opposite side of the carrier sheet from the carrier roller.

Clause 45. The method of clause 44, any other suitable clause, or any suitable combination of clauses, the method including applying a conductive-particle based fluid on the carrier sheet.

Clause 46. The method of clause 45, any other suitable clause, or any suitable combination of clauses, the method including applying a conductive-particle based fluid on the carrier sheet with the transfer roller to provide a coated carrier sheet.

Clause 47. The method of clause 46, any other suitable clause, or any suitable combination of clauses, wherein applying the conductive-particle based fluid includes discharging the conductive-particle based fluid onto the transfer roller.

Clause 48. The method of clause 47, any other suitable clause, or any suitable combination of clauses, wherein applying the conductive-particle based fluid includes rotating the metering roller and the transfer roller in the same direction to bring the conductive-particle based fluid into contact with the metering roller and to provide a uniform thickness of the conductive-particle based fluid on the transfer roller.

Clause 49. The method of clause 48, any other suitable clause, or any suitable combination of clauses, wherein applying the conductive-particle based fluid includes rotating the carrier roller in the same direction as the metering roller and the transfer roller to advance the carrier sheet past the transfer roller and the conductive-particle based fluid having the uniform thickness so that the conductive-particle based fluid is transferred to the carrier sheet to provide the coated carrier sheet.

Clause 50. The method of clause 49, any other suitable clause, or any suitable combination of clauses, the method including forming the coated carrier sheet into a conductive pad for the heat mat.

Clause 51. The method of clause 50, any other suitable clause, or any suitable combination of clauses, the method including attaching a conductor harness to the conductive pad, the conductor harness including a positive conductor bar arranged on a first side of the conductive pad and a negative conductor bar on an opposite second side of the conductive pad.

Clause 52. The method of clause 51, any other suitable clause, or any suitable combination of clauses, the method including applying a protective sheet over at least a portion of the conductor harness to locate the conductive-particle based fluid and the first and second conductive bars between the carrier sheet and the protective sheet and to provide the heat mat for the vehicle seat.

Clause 53. The method of clause 52, any other suitable clause, or any suitable combination of clauses, wherein applying the conductive-particle based fluid to the carrier sheet includes applying a plurality of sections of the conductive-particle based fluid to the carrier sheet.

Clause 54. The method of clause 53, any other suitable clause, or any suitable combination of clauses, wherein the plurality of sections includes a lower section and an upper section spaced apart from the lower section and the positive and negative conductive bars interconnect the front and upper sections.

Clause 55. The method of clause 54, any other suitable clause, or any suitable combination of clauses, wherein the plurality of sections further includes left and right side bolster sections that are spaced apart from the front and upper sections and the conductor assembly further includes additional conductor bars coupled to the left and right side bolster sections and to a respective one of the positive and negative conductor bars.

Clause 56. The method of clause 55, any other suitable clause, or any suitable combination of clauses, wherein applying a plurality of sections of the conductive-particle based fluid to the carrier sheet includes periodically stopping rotation of at least one of the metering roller and the transfer roller to stop application of the conductive-particle based fluid on the carrier sheet at predetermined intervals along the carrier sheet.

Clause 57. The method of clause 53, any other suitable clause, or any suitable combination of clauses, wherein the plurality of sections include a checkered pattern.

Clause 58. The method of clause 53, any other suitable clause, or any suitable combination of clauses, wherein the plurality of sections include a plurality of strips each connected to the positive and negative conductor bars.

Clause 59. The method of clause 52, any other suitable clause, or any suitable combination of clauses, wherein discharging the conductive-particle based fluid on the transfer roller includes ink jet printing the conductive-particle based fluid on the transfer roller.

Clause 60. The method of clause 59, any other suitable clause, or any suitable combination of clauses, wherein ink jet printing the conductive-particle based fluid on the transfer roller includes applying a predetermined pattern of the conductive-particle based fluid on the transfer roller.

Clause 61. The method of clause 60, any other suitable clause, or any suitable combination of clauses, wherein the method includes transferring the predetermined pattern to the carrier sheet so that the coated carrier sheet has the predetermined pattern.

Clause 62. The method of clause 61, any other suitable clause, or any suitable combination of clauses, wherein the predetermined pattern is defined by at least two sections where the conductive-particle based fluid is applied and separated by at least one section where there is no conductive-particle based fluid.

Clause 63. The method of clause 52, any other suitable clause, or any suitable combination of clauses, wherein discharging the conductive-particle based fluid onto at least one of the metering roller and the transfer roller includes dropping the conductive-particle based fluid onto at least one of the metering roller and the transfer roller by gravity.

Clause 64. The method of clause 52, any other suitable clause, or any suitable combination of clauses, wherein the conductive-particle based fluid is applied to the carrier sheet in a predetermined shape having regions that correspond with anticipated high-pressure areas between the heat mat and the occupant.

Clause 65. The method of clause 64, any other suitable clause, or any suitable combination of clauses, wherein the predetermined shape includes a torso section corresponding with a torso of the occupant and first and second leg sections spaced apart from one another and corresponding with each leg of the occupant.

Clause 66. The method of clause 52, any other suitable clause, or any suitable combination of clauses, wherein forming the conductive pad includes forming at least one ventilation opening in the coated carrier sheet, the at least one ventilation opening is configured to allow passage of air through the conductive pad when the heat mat is installed.

Clause 67. The method of clause 66, any other suitable clause, or any suitable combination of clauses, wherein the at least one ventilation opening is defined by an edge of the conductive pad, and forming the conductive pad includes reinforcing the edge with conductive reinforcement.

Clause 68. The method of clause 67, any other suitable clause, or any suitable combination of clauses, wherein the conductive reinforcement includes a metallic-based thread that is sown around the edge.

Clause 69. The method of clause 67, any other suitable clause, or any suitable combination of clauses, wherein the conductive reinforcement includes a metallic foil that is attached to the edge.

Clause 70. The method of clause 67, any other suitable clause, or any suitable combination of clauses, wherein the conductive reinforcement includes an additional layer of the conductive-particle based fluid that is applied to the edge.

Clause 71. The method of clause 67, any other suitable clause, or any suitable combination of clauses, wherein reinforcing the edge includes increasing conductivity at the edge.

Clause 72. The method of clause 52, any other suitable clause, or any suitable combination of clauses, wherein applying the protective cover includes applying an adhesive around a perimeter of the conductive pad and placing the protective cover on the adhesive.

Clause 73. The method of clause 72, any other suitable clause, or any suitable combination of clauses, wherein the protective cover includes a cover body and a cover extension and an aperture is formed at least partially in the cover extension.

Clause 74. The method of clause 73, any other suitable clause, or any suitable combination of clauses, wherein applying the protective cover to the conductive pad includes inserting the conductor harness through the aperture formed in the cover extension and folding the cover extension around the conductive pad so that a portion of the cover extension attaches to a backside of the carrier sheet.

Clause 75. The method of clause 52, any other suitable clause, or any suitable combination of clauses, wherein attaching the conductor harness to the conductive pad includes sewing the positive and negative conductor bars with a thread to the conductor pad over the conductive-particle based fluid.

Clause 76. The method of clause 75, any other suitable clause, or any suitable combination of clauses, wherein attaching the conductor harness to the conductive pad includes applying an additional layer of the conductive-particle based fluid over the positive and negative conductor bars and the thread.

Clause 77. The method of clause 52, any other suitable clause, or any suitable combination of clauses, wherein attaching the conductor harness to the conductive pad includes applying an additional layer of the conductive-particle based fluid over the positive and negative conductor bars.

The invention claimed is:

1. A method of manufacturing a heat mat for a vehicle seat, the method comprising
   conveying a carrier sheet along a conveyor to a coating station,
   applying a conductive-particle based fluid on the carrier sheet to provide a coated carrier sheet,
   forming the coated carrier sheet into a conductive pad for the heat mat,
   attaching a conductor harness to the conductive pad, the conductor harness including a positive conductor bar arranged on a first side of the conductive pad and a negative conductor bar on an opposite second side of the conductive pad, and
   applying a protective sheet over at least a portion of the conductor harness to locate the conductive-particle based fluid and the first and second conductive bars between the carrier sheet and the protective sheet and to provide the heat mat for the vehicle seat,
   wherein forming the conductive pad includes forming at least one ventilation opening in the coated carrier sheet, the at least one ventilation opening is configured to allow passage of air through the conductive pad when the heat mat is installed, and
   wherein forming the at least one ventilation opening in the coated carrier sheet includes removing material from the coated carrier sheet in an area that is aligned with a corresponding ventilation duct or passage of the vehicle seat when the heat mat is installed on the vehicle seat.

2. The method of claim 1, wherein applying the conductive-particle based fluid to the carrier sheet includes forming a plurality of sections of the conductive-particle based fluid on the carrier sheet.

3. The method of claim 2, wherein the plurality of sections includes a lower section and an upper section spaced apart from the lower section and the positive and negative conductive bars interconnect the lower and upper sections.

4. The method of claim 3, wherein the plurality of sections further includes left and right side bolster sections that are spaced apart from the lower and upper sections and the conductor assembly further includes additional conductor bars coupled to the left and right side bolster sections and to a respective one of the positive and negative conductor bars.

5. The method of claim 4, wherein gaps are formed between each of the sections.

6. The method of claim 2, wherein the plurality of sections include a checkered pattern.

7. The method of claim 2, wherein the plurality of sections include a plurality of strips each connected to the positive and negative conductor bars.

8. The method of claim 1, wherein applying the conductive-particle based fluid to the carrier sheet includes applying a predetermined pattern to the carrier sheet and wherein the predetermined pattern is defined by at least two sections where the conductive-particle based fluid is applied and separated by at least one section where there is no conductive-particle based fluid.

9. The method of claim 1, wherein the conductive-particle based fluid is applied to the carrier sheet in a predetermined shape having regions that correspond with anticipated high-pressure areas between the heat mat and the occupant, and wherein the predetermined shape includes a torso section corresponding with a torso of the occupant and first and second leg sections spaced apart from one another and corresponding with each leg of the occupant.

10. The method of claim 1, wherein applying the protective cover includes applying an adhesive around a perimeter of the conductive pad and placing the protective cover on the adhesive.

11. The method of claim 10, wherein the protective cover includes a cover body and a cover extension and an aperture is formed at least partially in the cover extension.

12. The method of claim 1, wherein attaching the conductor harness to the conductive pad includes sewing the positive and negative conductor bars with a thread to the conductor pad over the conductive-particle based fluid.

13. The method of claim 12, wherein attaching the conductor harness to the conductive pad includes applying an additional layer of the conductive-particle based fluid over the positive and negative conductor bars and the thread.

14. A method of manufacturing a heat mat for a vehicle seat, the method comprising conveying a carrier sheet along a conveyor to a coating station, applying a conductive-particle based fluid on the carrier sheet to provide a coated carrier sheet, forming the coated carrier sheet into a conductive pad for the heat mat, attaching a conductor harness to the conductive pad, the conductor harness including a positive conductor bar arranged on a first side of the conductive pad and a negative conductor bar on an opposite second side of the conductive pad, and applying a protective sheet over at least a portion of the conductor harness to locate the conductive-particle based fluid and the first and second conductive bars between the carrier sheet and the protective sheet and to provide the heat mat for the vehicle seat, wherein applying the protective cover includes applying an adhesive around a perimeter of the conductive pad and placing the protective cover on the adhesive, wherein the protective cover includes a cover body and a cover extension and an aperture is formed at least partially in the cover extension, and wherein applying the protective cover to the conductive pad includes inserting the conductor harness through the aperture formed in the cover extension and folding the cover extension around the conductive pad so that a portion of the cover extension attaches to a backside of the carrier sheet.

15. A method of manufacturing a heat mat for a vehicle seat, the method comprising conveying a carrier sheet along a conveyor to a coating station, applying a conductive-particle based fluid on the carrier sheet to provide a coated carrier sheet, forming the coated carrier sheet into a conductive pad for the heat mat, attaching a conductor harness to the conductive pad, the conductor harness including a positive conductor bar arranged on a first side of the conductive pad and a negative conductor bar on an opposite second side of the conductive pad, and applying a protective sheet over at least a portion of the conductor harness to locate the conductive-particle based fluid and the first and second conductive bars between the carrier sheet and the protective sheet and to provide the heat mat for the vehicle seat, wherein forming the conductive pad includes forming at least one ventilation opening in the coated carrier sheet, the at least one ventilation opening is configured to allow passage of air through the conductive pad when the heat mat is installed, and wherein the at least one ventilation opening is defined by an edge of the conductive pad, and forming the conductive pad includes reinforcing the edge with conductive reinforcement.

16. The method of claim 15, wherein the conductive reinforcement includes a metallic-based thread that is sown around the edge.

17. The method of claim 15, wherein the conductive reinforcement includes a metallic foil that is attached to the edge.

18. The method of claim 15, wherein the conductive reinforcement includes an additional layer of the conductive-particle based fluid that is applied to the edge.

19. The method of claim 15, wherein reinforcing the edge includes increasing conductivity at the edge.

* * * * *